United States Patent [19]

Bayley

[11] 4,148,433
[45] Apr. 10, 1979

[54] FRICTION REDUCING INSERT FOR SWINGING BUCKET ROTORS

[75] Inventor: Brian J. Bayley, Palo Alto, Calif.

[73] Assignee: Beckman Instruments, Inc., Fullerton, Calif.

[21] Appl. No.: 811,016

[22] Filed: Jun. 29, 1977

[51] Int. Cl.² .............................................. B04B 5/02
[52] U.S. Cl. .................................................... 233/26
[58] Field of Search ....................... 233/26, 1 R, 27, 11

[56] References Cited

U.S. PATENT DOCUMENTS 3,666,171   5/1972   Filz .......................................... 233/26

Primary Examiner—George H. Krizmanich
Attorney, Agent, or Firm—R. J. Steinmeyer; F. L. Mehlhoff; W. H. May

[57] ABSTRACT

An insert for use with swinging bucket rotors at the interface between the swinging bucket and the rotor arm trunnions which pivotally support the bucket. The insert is designed to decrease the friction between the swinging bucket and the support trunnions.

3 Claims, 10 Drawing Figures

FRICTION REDUCING INSERT FOR SWINGING BUCKET ROTORS

BACKGROUND OF THE INVENTION

This invention is directed to swinging bucket rotors and more particularly is directed to a means for reducing the friction between the bucket and the support pins or trunnions when the bucket moves or swings relative to the rotor body.

Presently it is necessary that the swinging buckets as well as the rotor pins or trunnions that support the buckets be made of strong material to withstand the high pressures and forces that are exerted at the bucket pin interface during the centrifugation. Inherent with these high strength materials is a high friction characteristic.

During the operation of the centrifuge, the swinging bucket moves from a generally vertical orientation to a generally horizontal orientation as the rotor moves from the zero speed to operational speed. Further, when the centrifugation operation is completed and the rotor decelerates, the bucket will move from its horizontal orientation down to its vertical or rest position. When the bucket is moving between its vertical and its horizontal orientations, there is constant relative movement between the bucket and the stationary pins. Because of the high friction characteristic of the materials used, this tends to cause galling at the bucket pin interface. The presence of galling will tend to prevent the bucket from returning to a complete vertical orientation, resulting in possible remixing of the centrifuged sample. Further, this galling can also cause a shortening of the life of the bucket by initiating cracks in the bucket material.

SUMMARY OF THE INVENTION

The present invention is an insert which is placed at the bucket pin interface to reduce the friction generated between the materials of the bucket and the pin. By reducing this friction the presence of galling is essentially eliminated and allows the bucket to return to its vertical orientation after the completion of the centrifugation run.

The insert has a coefficient of friction which is much less than the materials used to construct the bucket and pin. Further, the insert is somewhat pliable and, therefore, can be deflected during the operational speeds of the rotor to allow for the support of the bucket by the strong material of the support pins and slots in the bucket.

Because the bucket is allowed to return to its complete vertical orientation, there is less chance of remixing the centrifuge sample after the operational run.

DETAILED DESCRIPTION OF THE INVENTION

Figure 1:
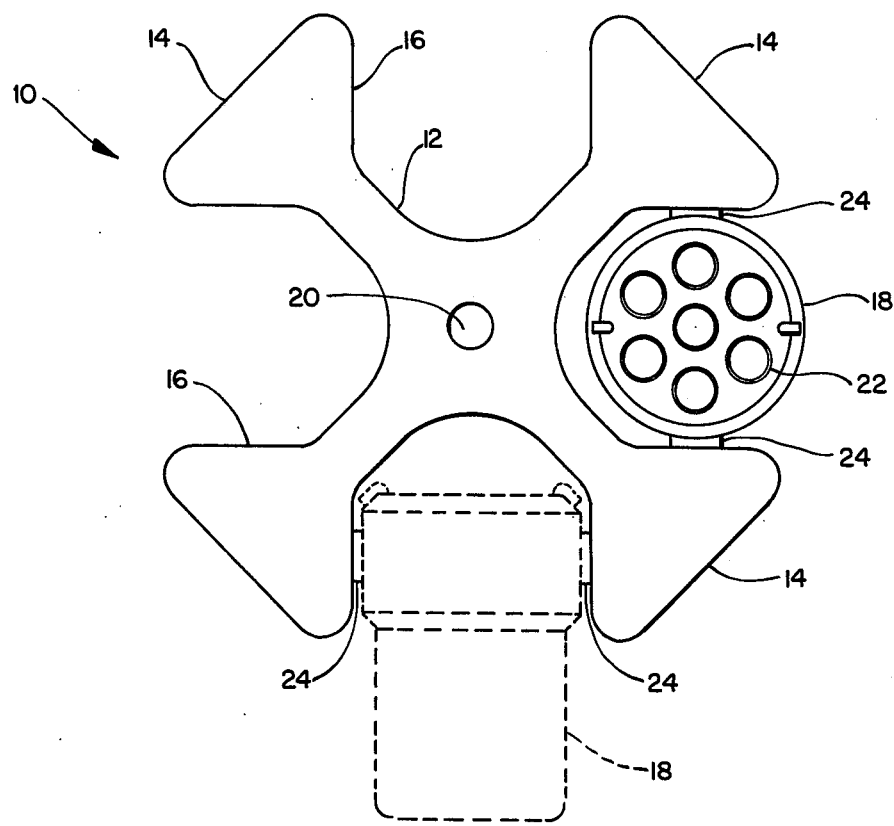
FIG. 1 is a top view of the rotor showing one bucket in the at rest position and a second bucket in phantom at the operational position.

A swinging bucket rotor 10 is shown in FIG. 1 having a body 12 formed with a plurality of radiating arms 14 to form a series of yokes 16 to receive swinging buckets 18. The rotor body 14 is mounted upon a shaft 20 for rotation during the operation of the centrifuge. The rotor bucket 18 shown in solid lines in FIG. 1 is in its vertical position at rest and contains a plurality of test tubes 22. The bucket 18 is supported on a pair of trunnions or support pins 24 that extend from opposing arms 14 into a yoke area 16. The bucket has at 180° spacing a pair of support slots 26 as shown more clearly in FIG. 6. The swinging bucket 18 is designed so that the support slots 26 receive the support pins 24. During the centrifugation operation the bucket 18 assumes the orientation as shown in phantom with the general longitudinal axis of the bucket being in a horizontal plane.

Figure 2:
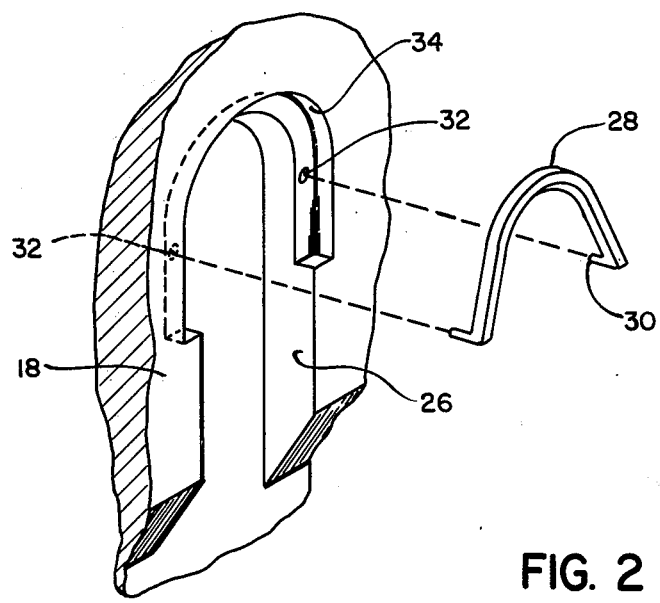
FIG. 2 is a perspective view of the insert of the present invention in an exploded orientation with respect to the bucket.

The present invention as shown in FIG. 2 with an insert 28 which is designed for insertion adjacent the support slot 26 in the bucket 18. The insert 28 is a generally elongated member having a rectangular cross section with a flange 30 at each end designed for receipt into the anchoring holes 32 in the bucket 18. Further, a shoulder 34 is recessed above the support slot 26 to receive the insert 28.

The insert 28 is preferably made of a slippery plastic material having a pliable or elastic characteristic, so that, when it is compressed and released, it will generally return to its precompressed shape.

Figure 3:
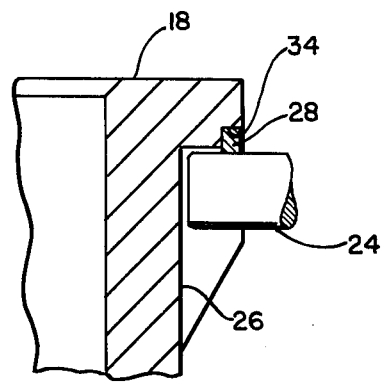
FIG. 3 is a partial sectional view of the interface between the support pin and the bucket showing the orientation of the insert when the bucket is at rest.
Figure 4:
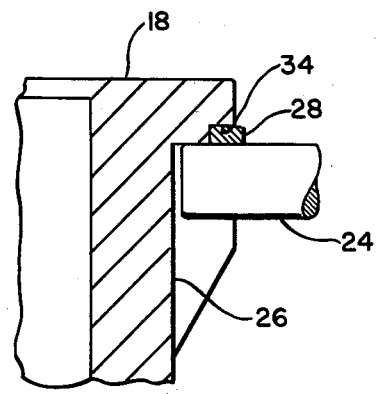
FIG. 4 is a partial sectional view similar to FIG. 3 showing the orientation of the insert when the bucket is at operational speed.

Turning to the operation of the present invention, reference is made to FIGS. 3 and 4 showing the configuration of the insert 28, respectively, when the bucket is at rest and when the bucket is at operational speed. In FIG. 3 the insert 28 carries the weight of the bucket 18 resting on the pin 24. Consequently, when the bucket is moving from its vertical orientation toward its horizontal or operational speed position, the slippery and low friction material of the insert 28 will enhance better respective movement between the bucket and the support pin and reduce the possible occurrence of galling. Further, this low friction interface will enhance the ability of the bucket, after the operational run has been completed, to return to its generally vertical orientation.

When the rotor has reached operational speed, the bucket will be subjected to high centrifugal forces as shown in FIG. 4 and cause a compression of the insert 28, so that there is direct contact between the bucket 18 and the support pin 24. Consequently, the high strength material of the support pin and the bucket 18 will withstand the high forces generated during the centrifugation. However, once the operational run has been completed and as the rotor decelerates to its stationary position, the insert 28 will again return to its general shape as shown in FIG. 3 at the time the bucket begins to move out of its horizontal orientation. The insert will support the bucket on the pin to provide the low friction interface and allow for the bucket to assume its complete vertical orientation.

Figure 5:
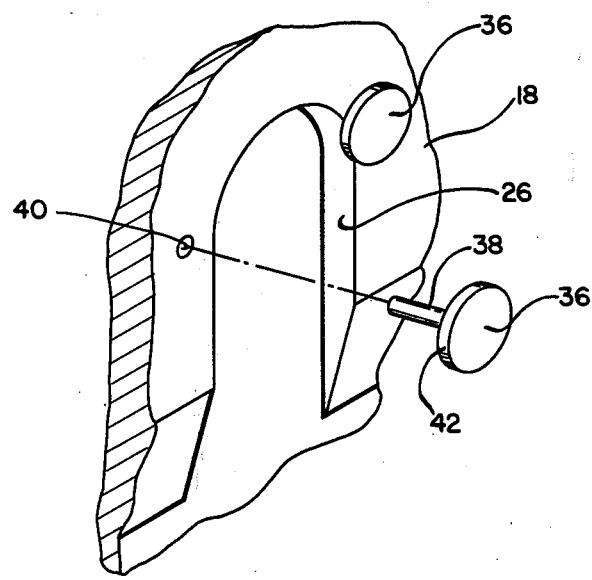
FIG. 5 is a perspective view of an alternate embodiment of the present invention.
Figure 6:
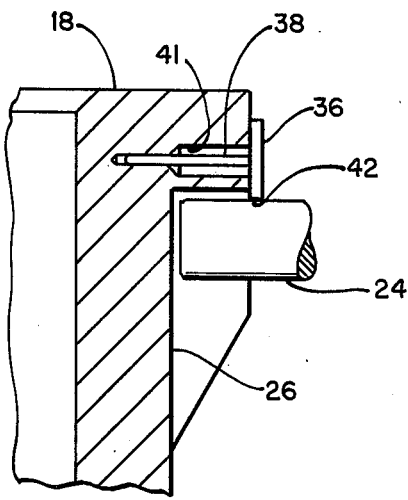
FIG. 6 is a partial sectional view showing the alternate embodiment of the present invention with the bucket at rest.
Figure 7:
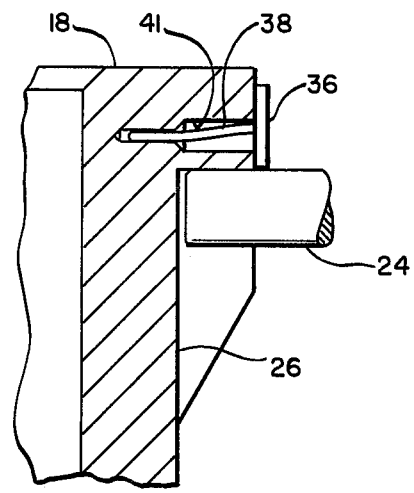
FIG. 7 is a partial sectional view similar to FIG. 6 showing the alternate embodiment of the present invention when the bucket is at operational speed.

An alternate embodiment of the present invention is shown in FIGS. 5–7 with the use of two identical button or disc inserts 36 which are made of a low friction pliable material. These button inserts have a stem 38 which is designed for receipt in the anchoring holes 40 located in the bucket 18 adjacent the support slot 26. The buttons 36 are positioned adjacent the support slot 26 in such a manner that when the rotor is at rest the support of the bucket will be received by the two respective button inserts 36 as shown in FIG. 6. The interface between the bucket 18 and each support pin 24 when the rotor is at rest will be on the low friction surface edge 42 on each of the button inserts 36.

It should be noted in FIG. 7 that the anchoring holes 40 have an enlarged counterbored area 41. During high speed centrifugation and the bucket is subjected to high centrifugal forces the insert leg 38 of each of the button inserts 36 deflects within the counterbore area 41, as shown in FIG. 7, and allows for the direct contact between the support pin 24 and the bucket 18. Once the centrifugation run is completed and the rotor begins to decelerate, the support insert buttons 36 will again return to their orientation as shown in FIG. 6 and provide the low friction support of the bucket on the support pins 24. The stems 38 are of sufficient rigidity to support the position of the buttons 36 in FIG. 6. The bucket will return to its complete vertical orientation and there also will be the general elimination of any potential galling which could occur during the frictional contact between the material of the pins and the bucket.

Figure 8:
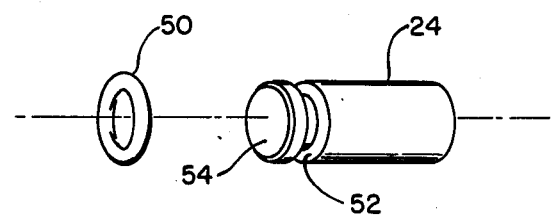
FIG. 8 is a perspective view of a second alternate embodiment of the present invention.
Figure 9:
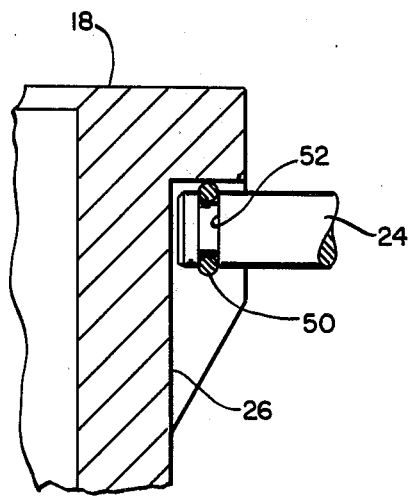
FIG. 9 is a partial sectional view of the second alternate embodiment of the present invention with the bucket at rest.
Figure 10:
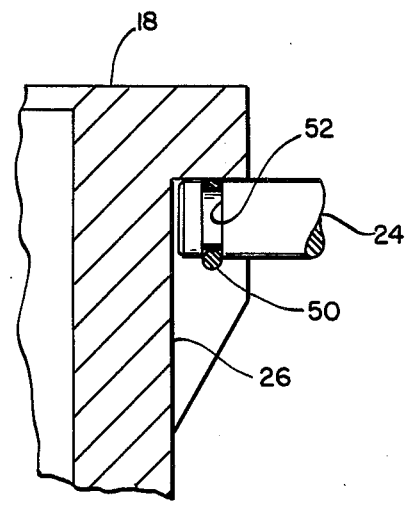
FIG. 10 is a partial sectional view similar to FIG. 9 showing the orientation of the second alternate embodiment of the present invention with the bucket at operational speed.

A second alternate embodiment of the present invention is shown in FIGS. 8–10. This embodiment utilizes an O-ring or collar 50 that is designed to be received in a groove 52 located at the end 54 of the support pin 24. The O-ring is made from a low frictional material and is designed to snap into the groove 52. When the rotor is at rest and the bucket 18 is at its vertical orientation, the support of the bucket is received on the O-ring 50 as shown in FIG. 9. Consequently, there is low friction between the relative movement of the bucket and the support hinge when the O-ring is in the orientation shown in FIG. 9.

During operational speeds of the rotor when the bucket assumes a generally horizontal orientation and is subjected to the high centrifugal forces, the O-ring will assume its orientation as shown in FIG. 10. The O-ring will be compressed so that there is direct contact between the bucket 18 and the support hinge 24. Therefore, the high strength material of the bucket and support pin will withstand the forces generated during the centrifugation. Once the centrifugation run has been completed and the rotor begins to decelerate from its high speed operation, the O-ring will generally return to its configuration shown in FIG. 9 The ring 50 will assume the support of the swinging bucket 18 to provide for the low frictional movement between the bucket and the support pins and allow the bucket to return to its complete vertical orientation.

Although all of the above embodiments show the pins or trunnions extending from or connected to the rotor, it is envisioned that the present invention is equally applicable to configurations where the trunnions are connected to the bucket and the slots are positioned in the rotor arms. In such a configuration the friction reducing inserts could be positioned within the rotor arms rather than in the bucket.

It is envisioned that other embodiments of the present invention could be utilized and still fall within the scope of the invention directed to the concept of utilizing a low friction insert of some type to be placed at the interface between the bucket and the support hinge to reduce the presence of galling and allow for the bucket to obtain its full vertical orientation when the rotor is at rest.

What is claimed is:
1. A centrifuge rotor comprising:
a rotor frame;
at least two pivotal containers for carrying fluid samples;
means mounted on one of said frame and said container for pivotally supporting said containers on said rotor frame, said containers pivotal between a first position and a second position; and
an insert located between each of said containers and said supporting means for reducing the friction between said container and said supporting means when said container moves between said first and second positions, said insert member being made of a material having a coefficient of friction less than the coefficient of friction of the material of said support means and said container, said insert member is sized, so that, when said rotor is at rest and said container is in said first position, said supporting means is in contact with only said insert member and wherein said insert member is elastic enough, so that, when said rotor is at operational speeds and said container is in said second position, said supporting means is in direct contact with said container and said insert member has been compressed.

2. A centrifuge rotor as defined in claim 1, wherein each of said containers has a pair of U-shaped recessed support shoulders and wherein said insert is generally U-shaped and is positioned on each of said containers within each of said shoulders.

3. A centrifuge rotor as defined in claim 1, wherein said insert comprises a pair of disc members each with a pliable stem positioned within said container, said disc members having a circumferential edge for contact with said supporting means.

* * * * *